Jan. 3, 1967  S. HUPPERT  3,295,554
VALVE CONSTRUCTION
Filed July 29, 1964  2 Sheets-Sheet 1
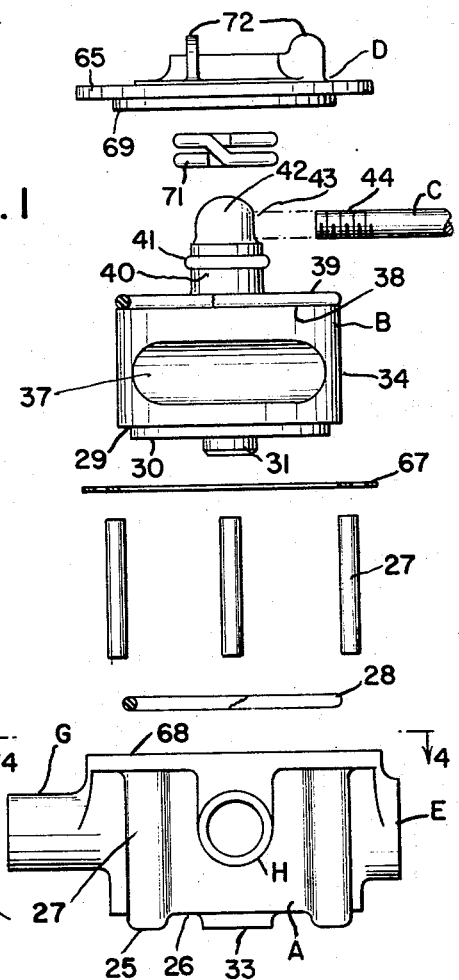
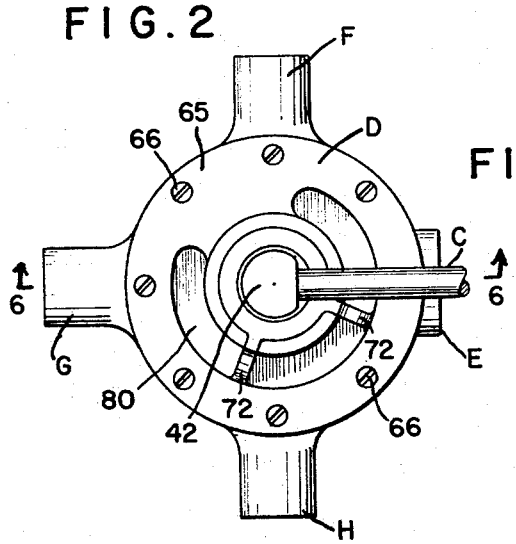
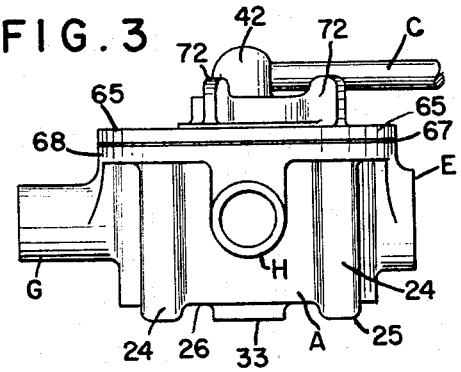
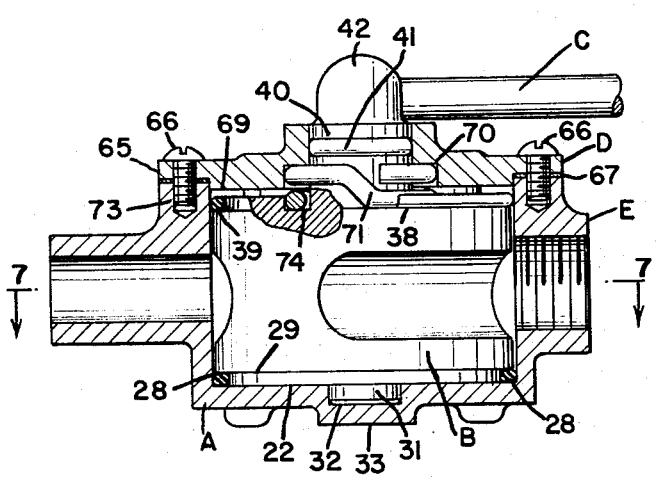
INVENTOR.
STANLEY HUPPERT
BY Harry Price
ATTORNEY INVENTOR.
STANLEY HUPPERT
BY Harry Price
ATTORNEY

United States Patent Office 3,295,554
Patented Jan. 3, 1967

3,295,554
VALVE CONSTRUCTION
Stanley Huppert, Hartsdale, N.Y., assignor to American Machine Products, Inc., Flushing, N.Y., a corporation of New York
Filed July 29, 1964, Ser. No. 385,844
1 Claim. (Cl. 137—625.43)

The present invention relates to a valve construction and it particularly relates to a rotary valve construction.

Although the present invention has wide-spread application it will be particularly described in connection with its use for a valve construction which enables a supply of water for swimming pools and associated equipment.

It is an object of the present invention to provide a simple, readily operated valve construction which may be employed in connection with flow of water to swimming pools and the like and which will be effective in controlling the flow without leakage or bypassing and yet be a relatively simple, inexpensive construction.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects it has been found most satisfactory in accordance with one embodiment of the present invention to supply an integral, cup-shaped housing having four vertical side grooves each receiving a tubular rubber sealing member projecting into the chamber and bottom and top circular cylindrical members serving as top and bottom seals.

Interiorly positioned is a cylindrical member having opposite side grooves for connecting opposing ports which are positioned at 90° in respect to each other.

Desirably the top of the device is provided with a gasket and a cover which through an intermediate spring will hold the rotating element tightly in position and prevent loosening thereof and assure supply between connected ports without leakage.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings, wherein like reference characters denote corresponding parts throughout the several views:

FIGURE 1 is a separated side elevational view showing the various elements of the valve construction.

FIG. 2 is a top plan view of the assembled valve.

FIG. 3 is a side elevational view taken from the bottom of FIG. 2.

FIG. 6 is a side sectional view of the assembled valve construction taken upon the line 6—6 of FIG. 2.

Figure 4:
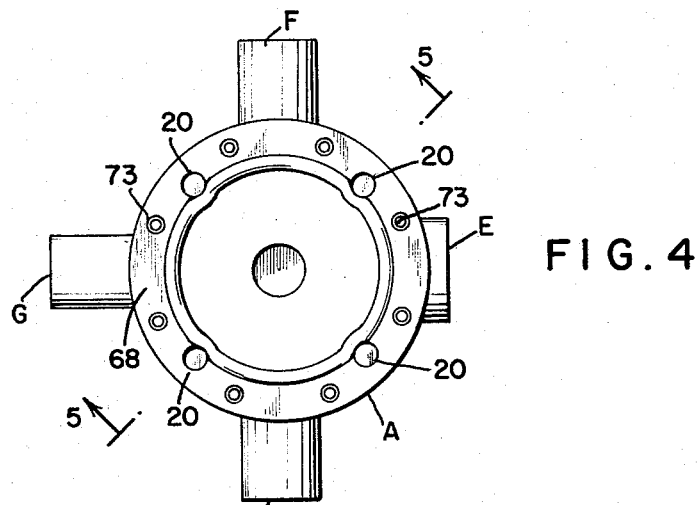
FIG. 4 is a top plan view of the housing with the cover and valve member removed, upon the line 4—4 of FIG. 1.
Figure 5:
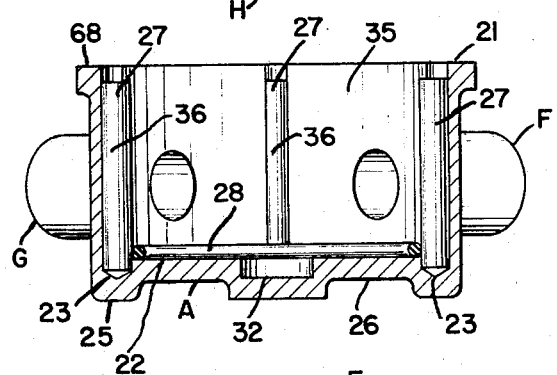
FIG. 5 is a side sectional view upon the line 5—5 of FIG. 4.

Referring to FIGS. 1 to 7, there is shown a valve body A, a rotary valve member B having a handle C and a cover D.

The valve body A has the inlet port E and the outlet ports F, G and H.

The interior of the valve body is provided with the cylindrical grooves or cutouts or drill holes 20 which extend the full height thereof from the top 21 to below the bottom 22 to form the recesses 23.

These are provided inside of the enlarged side wall portions 24 which extend into the bottom extensions 25 which are below the bottom wall 26.

In each of these cylindrical openings 20 is provided a rubber tubular cylindrical gasket member 27 which members are positioned midway between the ports E, F, G and H and these act to prevent flow between said ports.

On the bottom inside wall 22 of the housing A is positioned a circular rubber ring 28 which fits below the ledge 29 and inside of the extension 30 of the rotary valve member B.

The bottom of the extension 30 fits closely against the bottom inside face or wall 22 and it has a central projection 31 which fits in the recess 32 and is formed inside of the enlargement 33 in the housing A.

As shown in FIG. 6, the gasket 28 will substantially fill the recess formed between the shoulder 29 and the portion 30 of the valve body B and the bottom of the housing A.

The side wall of the rotary member B, as indicated at 34, closely fits the interior wall 35 of the housing and will contact and slightly compress the outer faces 36 of the vertical tubular gasket members 27.

The side walls 34 of the rotary member B are provided with the horizontal cutouts 37, two of which are provided on each side of the rotary valve member B.

The rotary valve member B may also carry on its top face 38 an additional circular gasket 39 and it will have a projecting stem 40 with a sealing circular gasket 41 fitted thereinto.

The extension 40 will terminate in an outside cap 42 having a tapped recess 43 which receives the threaded end 44 of the handle C.

The cover D has an outwardly extending flange 65 to receive the attachment screws 66 which will clamp the gasket 67 in place on the top face 68 of the body structure A.

The cover has a small diameter insert portion 69 which fits inside of the top of the body opening A as shown in FIG. 6 and holds in position in the recess 70 the double coil spring 71 which presses the cylindrical member B down into the recess of the housing A.

The cover is also provided with the stops 72 to enable it to be readily removed when the screws 66 are removed. These screws will be screwed into the tapped recesses 73 in the top face of the valve body A.

It will be noted that the central portion of the top of rotating body B has a recess 74 to receive the lower coil of the spring 71.

The valve as shown may be readily assembled from the parts as shown in FIG. 1 to form the unitary assembly as indicated in FIGS. 2, 3, 6 and 7.

Figure 7:
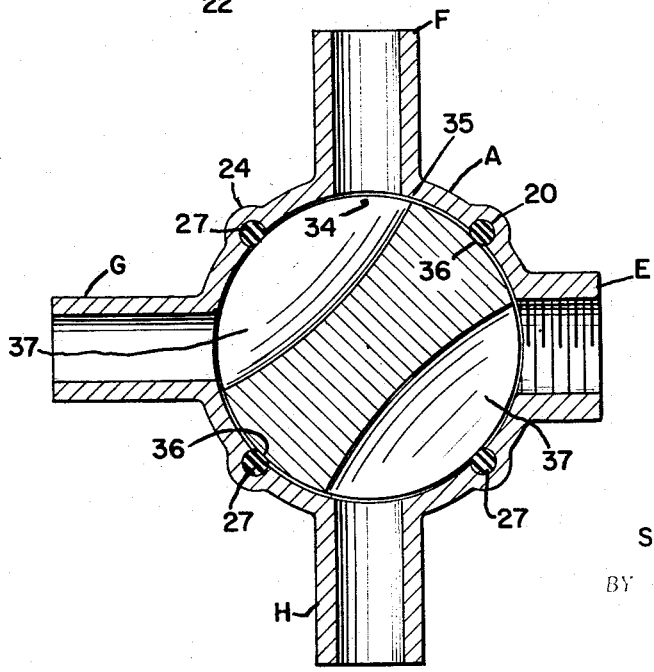
FIG. 7 is a transverse horizontal sectional view taken upon the line 7—7 of FIG. 6.

By turning the handle C between the stops 72 it is possible to connect the ports F and G on one hand and E and H on the other hand, as shown in FIG. 7, or the ports E and F and G and H, in the 270° removed position. This will give a most adequate valving arrangement and will permit ready connection between the various ports E, F, G and H and eliminate any leakage.

The gasket 39 may be loose in position or may be of such a size as to be clamped down by the extension 69 of the cover. The cover may be provided with a recessed groove 80 extending between and beyond the stops 72 and one of the stops 72 may be marked as the filter stop and the other one as the wash stop, depending upon the specific use of the unit.

While there has been herein described a preferred form of the invention, it should be understood that the same may be altered in details and in relative arrangement of parts within the scope of the appended claim.

Having now particularly described and ascertained the nature of the invention, and in what manner the same is to be performed:

What is claimed is:

A valve construction having a valve body with a vertical axis taking the form of a cylindrical central housing with a closed bottom, an open top and tubular outlet ports extending radially outwardly from the middle of the sides of the body at 90° intervals, said ports having central horizontal passageways therethrough, a cylindrical rotary valve body member therein having opposite inwardly extending port connection horizontal slots taking up a major portion of the transverse horizontal area thereof and having a vertical width substantially as high as the diameter of the horizontal passageways, said body having an interior cylindrical chamber closely fitting said body member and having vertical cylindrical grooves spaced midway between said ports and extending below the bottom face of the chamber and to the open top and cylindrical plastic sealing means filling said grooves and a detachable cover for said body, said horizontal slots extending over a major portion of the horizontal area of the body member and having a base cut out line which curves inwardly from port to port so that the full flow area of the passageway in the port will open into the slot and said plastic sealing means extending down to the bottom of said cylindrical grooves and to below a bottom circular sealing means and contacting the outer periphery of the bottom sealing means and having a substantially greater diameter than the circular sealing means which are positioned above and below the valve member, and a double coil spring positioned on top of said body member and below said cover and having recesses in the central portion of said cover and the top of the valve body to receive the respective coils thereof and a recess in the center of the interior of the closed bottom and a nipple projecting downwardly along the central vertical axis of the body member and closely fitting in said recess.

References Cited by the Examiner
UNITED STATES PATENTS

| 734,186 | 7/1903 | Mack | 137—625.43 |
| 911,858 | 2/1909 | Watters | 137—625.23 |
| 1,417,808 | 5/1922 | Dewey | 251—286 X |
| 2,145,628 | 1/1939 | Milliken | 251—183 X |

FOREIGN PATENTS

| 1,331,963 | 6/1963 | France. |

M. CARY NELSON, *Primary Examiner.*

E. K. FEIN, *Assistant Examiner.*